US006982803B2

(12) United States Patent
Eguchi

(10) Patent No.: US 6,982,803 B2
(45) Date of Patent: Jan. 3, 2006

(54) FACSIMILE SERVER, ELECTRONIC MAIL DEVICE, AND COMMUNICATION METHOD

(75) Inventor: Masashi Eguchi, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 845 days.

(21) Appl. No.: 09/923,265

(22) Filed: Aug. 3, 2001

(65) Prior Publication Data

US 2002/0054363 A1 May 9, 2002

(30) Foreign Application Priority Data

Aug. 11, 2000 (JP) ............................ 2000-243745

(51) Int. Cl.
*G06F 15/00* (2006.01)
*H04N 1/00* (2006.01)

(52) U.S. Cl. ...................... 358/1.15; 358/402; 358/404

(58) Field of Classification Search ............... 358/1.15, 358/402, 405, 407; 709/206

See application file for complete search history.

(56) References Cited

U.S. PATENT DOCUMENTS 5,754,778 A * 5/1998 Shoujima .................... 709/206
2002/0054335 A1 * 5/2002 Sekiguchi ................. 358/1.15

FOREIGN PATENT DOCUMENTS

| | | |
|---|---|---|
| JP | 10-164308 | 6/1998 |
| JP | 11-146107 | 5/1999 |
| JP | 2000-035927 | 2/2000 |
| JP | 2000-083126 | 3/2000 |
| JP | 2000-112842 | 4/2000 |
| JP | 2001-339423 | 12/2001 |

* cited by examiner

*Primary Examiner*—Kimberly Williams
*Assistant Examiner*—Charlotte M. Baker
(74) *Attorney, Agent, or Firm*—Hogan & Hartson, LLP

(57) ABSTRACT

A facsimile server referring to an electronic mail server for the data size of electronic mail which has reached the electronic mail server, detecting a receivable data size, and comparing the incoming electronic mail with the receivable data size. When the data size of the incoming electronic mail exceeds the receivable size, the facsimile server receives the incoming electronic mail from the electronic mail server by the packet and sends the electronic mail by the packet to a designated address.

13 Claims, 3 Drawing Sheets

FACSIMILE SERVER, ELECTRONIC MAIL DEVICE, AND COMMUNICATION METHOD

CROSS REFERENCES TO RELATED APPLICATIONS

This application claims priority under 35 USC 119 of Japanese Patent Application No. 2000-243745 filed in JPO on Aug. 11, 2000, the entire disclosure of which is incorporated herein by reference.

BACKGROUND OF THE INVENTION

1. Field of the Invention

The present invention relates to a facsimile server and an electronic mail device as a client of an electronic mail server. More particularly, the present invention relates to processing when the electronic mail of unprocessible data size reaches the electronic mail server.

2. Description of the Related Art

In the Internet facsimile, a facsimile server is connected to a LAN, and a facsimile is transmitted and received via an electronic mail server in electronic mail form. The facsimile server is a G3 facsimile to which a LAN interface is added, for instance.

While an electronic mail server is generally provided with a high-capacity auxiliary storage, a storage capacity of a facsimile server which does not often exchange large-scale data is generally small. Therefore, it is impossible for the facsimile server to process a received electronic mail which exceeds the storage capacity of the facsimile server.

SUMMARY OF THE INVENTION

In view of the foregoing, it is an object of the present invention to provide a processing method in which when electronic mail whose size exceeds the receiving ability of a facsimile server or an electronic mail device as an electronic mail client arrives at the electronic mail server, the electronic mail is sent to a designated address and the electronic mail is processed at the designated address. In this manner, it is possible to process the electronic mail whose size exceeds the receiving ability of the facsimile server or the electronic mail device.

It is another object of the present invention to provide a facsimile server or an electronic mail device, which is connected to an electronic mail server, including means for referring for size of electronic mail which is addressed to the facsimile server or the electronic device and which reached the electronic mail server, and comparing the size of this incoming electronic mail with receivable size. This facsimile server further includes means for receiving the electronic mail by the packet and sending the electronic mail as error electronic mail by the packet to a designated address when the size of the incoming electronic mail exceeds the receivable size.

Preferably, the designated address is a sending side of incoming electronic mail or an information processing device which belongs to a LAN manager.

It is still another object of the present invention to provide a communication method in which a facsimile server or an electronic mail device is connected to the electronic mail server via a LAN to receive electronic mail. This method including the steps of referring for size of the incoming electronic mail to make a comparison between the size of the incoming electronic size and the receivable size, receiving the electronic mail by the packet when the size of the incoming electronic mail exceeds the receivable size, and sending the electronic mail as error electronic mail by the packet to a designated address.

According to one aspect of the present invention, there is no fear that a system error may occur due to electronic mail exceeding receivable size in a facsimile server or a electronic mail device which has limited memory capacity because unreceivable electronic mail due to an excess of size is received by the packet and re-sent by the packet as error electronic mail to a designated address without restoring the electronic mail. An electronic mailbox does not keep the electronic mail for hours, so that such a burden is not imposed on an electronic mail server. Moreover, the error electronic mail can be processed at the receiving spot to which the electronic mail is re-sent.

According to another aspect of the present invention, a receiver's address of the error electronic mail is a transmission source of the incoming electronic mail or an information processing device belonging to a LAN manager. The incoming electronic mail is sent back to the sending side (transmission source) as the error electronic mail, so that the sending side knows which electronic mail has failed to be received and it is possible to divide the electronic mail to re-send. Alternatively, the error electronic mail is forwarded to the information processing device belonging to the LAN manager, so that the manager or the manager's information processing device can return the electronic mail to the sender of the electronic mail as non-receivable electronic mail or delete the electronic mail in case of junk electronic mail.

Additional objects, aspects, benefits and advantages of the present invention will become apparent to those skilled in the art to which the present invention pertains from the subsequent detailed description and the appended claims, taken in conjunction with the accompanying drawings.

DETAILED DESCRIPTION OF THE INVENTION

Figure 1:
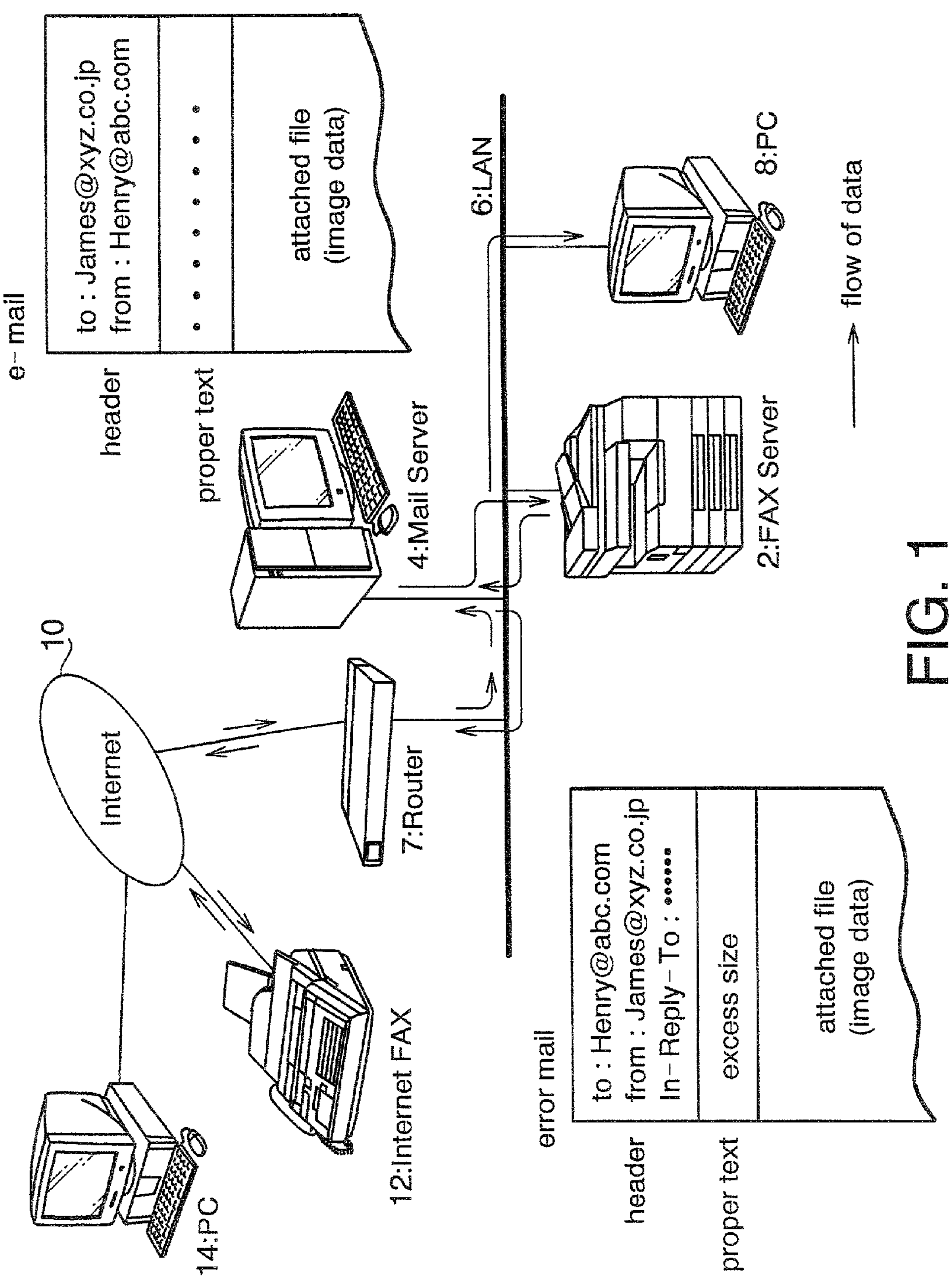
FIG. 1 is a block diagram showing a connection of a facsimile server according to an embodiment of the present invention.

In FIG. 1, a facsimile server 2 as an electronic mail client is connected via a LAN 6 to an electronic mail server 4, a router 7, a personal computer 8 on the LAN 6, and so on. SMTP (Simple Mail Transfer Protocol) and POP3 (Post Office Protocol 3) are used as electronic mail protocols, and the electronic mail server 4 is used as an SMTP server and a POP 3 server. The personal computer 8 belongs to a manager managing the LAN 6 and is provided with an administration tool of the LAN 6. The router 7 connects the Internet 10 to the LAN 6, and the reference number 12 designates an Internet facsimile device which is implemented with a combination of the electronic mail client and the facsimile server, for instance. The reference number 14 designates a personal computer connected to the Internet 10. The Internet 10 includes a WAN and the LAN connected to the Internet besides the worldwide scale Internet itself. In FIG. 1, a transmitting channel of the electronic mail which is sent from the Internet facsimile device 12 to the facsimile server 2 and the error electronic mail is shown with arrows.

Facsimile data converted to an electronic mail format is illustrated at the upper right in FIG. 1. A header including a destination address ("James" in FIG. 1), a sender address ("Henry" in FIG. 1), a sending date, time, a message-ID (an identification number, for instance) of the electronic mail, etc., is accompanied by proper text. An attached file includes image data which is the body of the facsimile data. The destination address "James" is a name of the facsimile server 2, and the sender address "Henry" is a personal computer on the LAN, the internet facsimile device 12 connected to the Internet, or the personal computer 14 connected to the Internet.

At the lower left in FIG. 1, a data format of the error electronic mail is shown when returning the electronic mail, which can not be received as a whole due to the excess size, to the sender by the same packet after receiving the electronic mail by the packet. In the header of the error electronic mail, a destination address ("Henry" in FIG. 1 which is the transmission source of the electronic mail) and a name of the facsimile server which is a sender of the error electronic mail ("James" in FIG. 1) are entered, and following a word "In-Reply-To", a message-ID of the original electronic mail is entered. By doing this, the sender ascertains which electronic mail has failed to be received. A destination address may be the personal computer 8 belonging to the manager of the LAN 6 and a computer program stored in the personal computer 8 and so forth or the manager himself may process the error electronic mail. For instance, the manager of the LAN 6 can carry out processing such as returning the electronic mail to the sender as non-receivable electronic mail or deleting the electronic mail as junk electronic mail.

The proper text of the error electronic mail, which has a message such as "The electronic mail was unable to be normally received due to an excess of a size." and a header of the original electronic mail indicates that the electronic mail was unable to be received due to an excess of a size. The attached file of the error electronic mail is accompanied by the proper text of the original electronic mail and image data.

Figure 2:
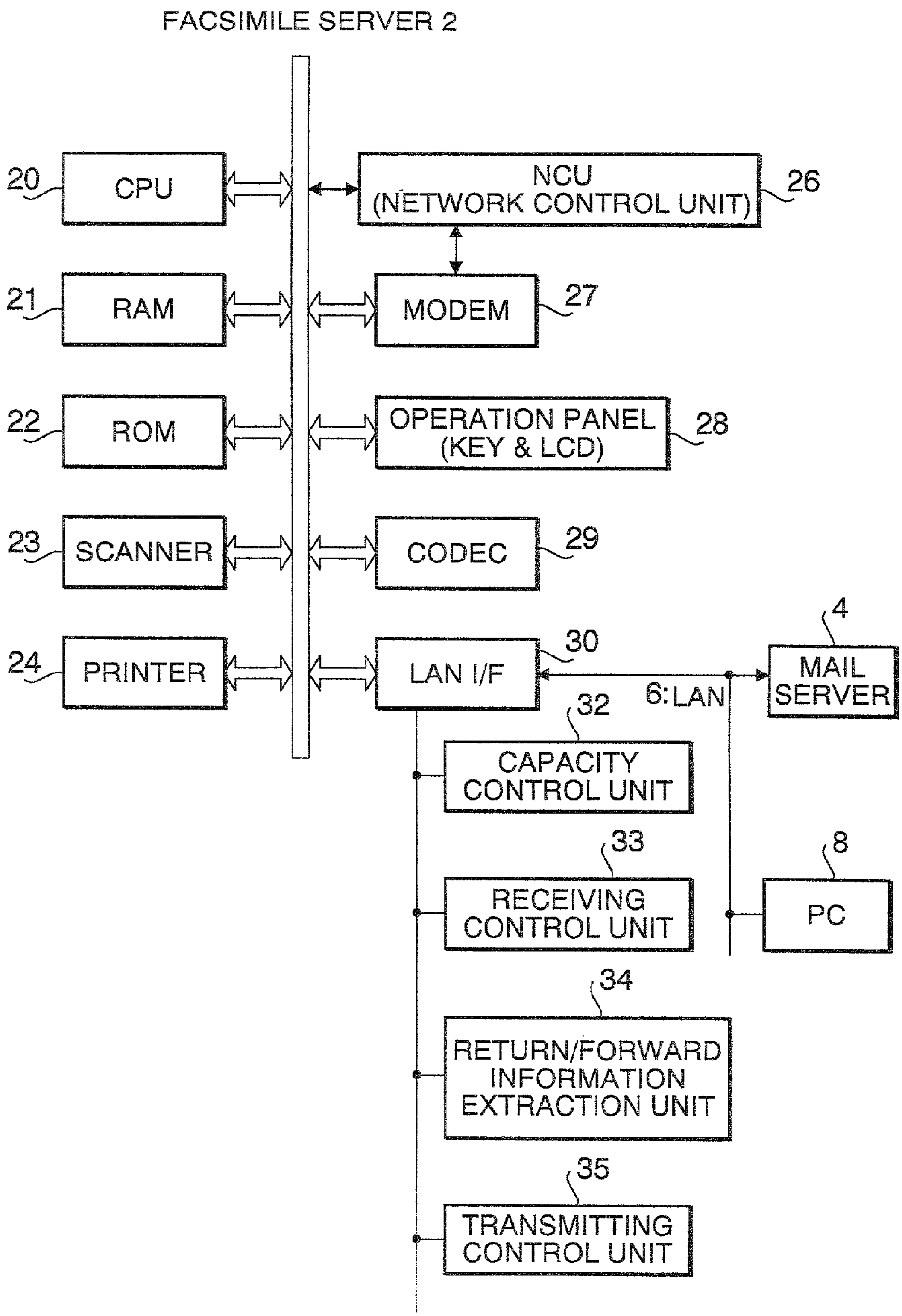
FIG. 2 is a block diagram showing composition of the facsimile server shown in FIG. 1.

In FIG. 2, the structure of the facsimile server is shown. The reference number 20 designates a Central Processing Unit (CPU) for controlling following units, and the reference number 21 designates a RAM (Random Access Memory) with a capacity of the order of 16 to 128 Mbytes to store data such as image data or data in processing, and the available capacity of the RAM fluctuates at all times. The reference number 22 designates a ROM (Read Only Memory) to store a program etc., 23 a scanner for inputting an image, and 24 a printer for a hard copy. The reference number 26 designates a NCU (Network Control Unit) for connection to the Public Switched Telephone Network, 27 a modem, and 28 an operating/displaying unit (Operation Panel) provided with a keyboard and an LCD (Liquid Crystal Display). The reference number 29 designates a CODEC to perform encoding and decoding to compress redundancy for communication, 30 a LAN interface for connection to the LAN 6. These units are connected to one another.

The communication on the Internet facsimile and the LAN 6 is conducted with the LAN interface 30, and the communication is conducted in the electronic mail form by using SMTP (Simple Mail Transfer Protocol) and POP 3 (Post Office Protocol 3), for instance. The electronic mail has a header entering a destination address, a sender address and so on. The electronic mail also has proper text (in the case of error electronic mail, the text would be a message "The electronic mail was unable to be received due to an excess of a size." etc.) and an attached file whose facsimile data (image data) is converted from binary data to a data format for the Internet. A header represents a header in a narrow sense in this specification, but the combination of a header and proper text may be regarded as a header to an attached file.

The LAN interface 30 is connected via the LAN 6 to the electronic mail server 4 and the personal computer 8 of the LAN manager. A capacity control unit 32 as a subsystem of the LAN interface 30 detects an image data size which can be stored in the RAM 21 (a size of an available capacity) and refer to the electronic mail server 4 for presence or absence of electronic mail addressed to the facsimile server 2 and a data size. When the data size of the electronic mail which reached the electronic mail server 4 exceeds the image data size which can be stored in the RAM 21, the capacity control unit 32 outputs the effect to a receiving control unit 33, a return/forward information extraction unit 34, and a transmitting control unit 35.

The receiving control unit 33 manages the receipt of the electronic mail which reached the electronic mail server 4. The return/forward information extraction unit 34 creates a destination address to return or forward the electronic mail and extracts a return address from the header of the incoming electronic mail, for instance. The transmitting control unit 35 manages the transmission of the electronic mail. In normal times, the receiving control unit 33 manages the receipt of the electronic mail, the return/forward information extraction unit 34 extracts or create a return address or a forwarding address, and the transmitting control unit 35 manages the transmission of the electronic mail.

When the incoming electronic mail can not be received as it is because of the excess size, the receiving control unit 33 makes the electronic mail server 4 receive the electronic mail by the packet, and the return/forward information extraction unit 34 creates a return address or a forwarding address. For example, when the facsimile server 2 is set in "forward" position as a measure against the excess size, the LAN 6 manager's address stored in the LAN interface 30 is chosen as the forwarding address. On the other hand, in the case that the facsimile server is set in "return" position, a sender's address is extracted from the header of the reached original electronic mail and regarded as a return address. The data in the header of the error electronic mail is extracted from the header of the incoming electronic mail by the return/forward information extraction unit 34. The transmitting control unit 35 manages the transmission of the received packet by the same packet as it is to the address created or extracted by the return/forward information extraction unit. Therefore, the excess size electronic mail is received by the packet and sent again by the packet on the spot to clear memory used for the receipt of the electronic mail, so that it is possible to carry out reception without wasting memory. The message such as "The electronic mail was unable to be received due to an excess of a size." in the proper text of the error electronic mail is created in the transmitting control unit 35 etc.

Figure 3:
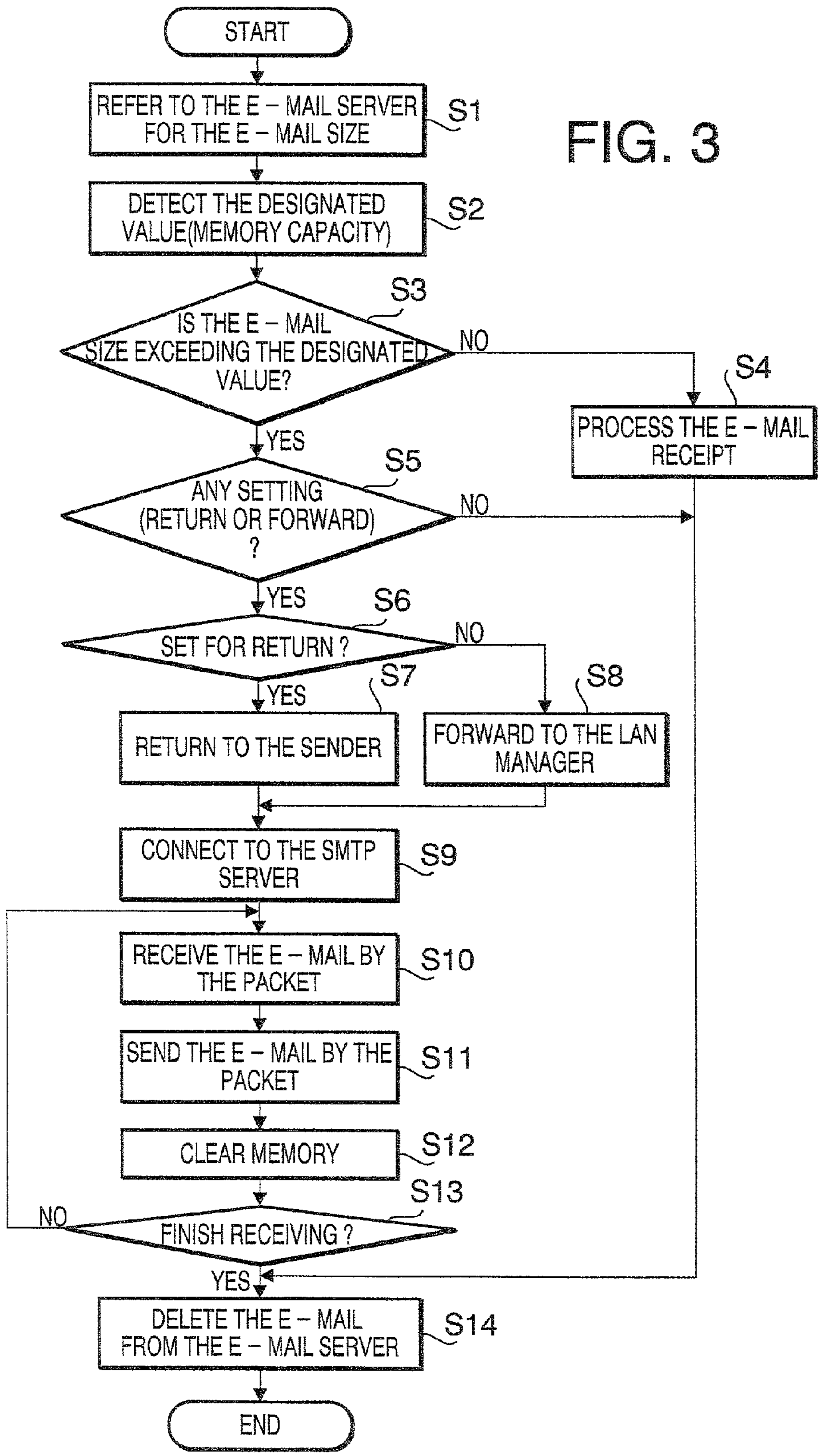
FIG. 3 is a flow chart showing a process of receiving, returning, or forwarding electronic mail when a size of the electronic mail is larger than a designated value in the facsimile server shown in FIG. 2.

FIG. 3 illustrates the operation of the embodiment. The electronic mail, addressed to the facsimile server 2, which the electronic mail server 4 has received is saved in the electronic mail box in the electronic mail server 4. The facsimile server 2 refers to the electronic mail server 4 for presence or absence of the received electronic mail and the data size by using the LIST command of POP3 (step 1), checks the condition of the RAM 21 etc., and determines the available amount of storage (the size of receivable electronic mail) as a designated value (step 2). When the data size of the electronic mail which has reached the electronic mail server 4 is smaller than the designated value (step 3), the electronic mail is received as usual (step 4). That is, when the size is smaller than the designated value, a plurality of packets of the electronic mail are successively received, and thereby the electronic mail is restored.

In the case that the data size of the electronic mail which has reached the electronic mail server 4 is larger than the designated value, if the setting of "return" or "forward" position is not chosen in the facsimile server 2 (step 5), the facsimile server 2 does not receive the electronic mail from the electronic mailbox, the electronic mail remains in the electronic mail box, and for instance, the electronic mail is deleted by the LAN manager. If "return" position is chosen as a setting (step 6), the sender's electronic mail address is extracted from the header, and the header of the error electronic mail is prepared with a destination designated as the original sender of the electronic mail (step 7). If "forward" position is chosen as a setting, the header of the error electronic mail is prepared with a destination designated as the LAN manager's personal computer (step 8). Then, connection to a SMTP server for transmission in the electronic mail server 4 is carried out to prepare for transmission (step 9). The electronic mail in the electronic mailbox of the electronic mail server is received by the packet (step 10), and then re-sent by the packet as it is to the original sender's address of the electronic mail or the forwarding address without restoring the electronic mail (step 11). The memory which was used for the receipt of the electronic mail is then cleared (step 12). The steps of receiving the electronic mail by the packet, transmission, and clearing the memory-are repeated until receiving data from the electronic mail server 4 is completed (step 13). Afterwards, when unnecessary electronic mail remains in the electronic mail box of the electronic mail server, the electronic mail is deleted from the electronic mail box in the electronic mail server 4 by a DELE command of POP3 (step 14).

Since setting the facsimile server 2 for returning or forwarding the error electronic mail enables the facsimile server 2 to extract the electronic mail from the electronic mail server 4 to return or forward the electronic mail, the electronic mail does not remain at the electronic mail server 4. The facsimile server 2 receives the excess size electronic mail by the packet and returns or forwards the electronic mail as it is by the packet, so that it is possible to receive and re-send the electronic mail easily. Since it is possible to process the received electronic mail at the returned address or the forwarding address, measures can be taken such as dividing the original electronic mail to perform resending from the returned address in the case of important information. The present invention is not limited to the described and illustrated embodiment. The present invention can be also applied to an Internet facsimile device, an electronic mail device and an personal computer which have a mail client function, and is particularly effective to an embedded-type device.

What is claimed is:

1. A recording medium for recording a program to be executed by a computer, comprising:

program code means for making a computer receive electronic mail by the packet when a size of the electronic mail exceeds a size of electronic mail which can be received by the computer; and program code means for making the computer send said each packet of the electronic mail to a designated address when the size of said electronic mail exceeds the size of electronic mail which can be received by the computer.

2. The recording medium according to claim 1, further including:

program code means for making the computer refer to an electronic mail server, via which said electronic mail is received by the computer, for the size of the electronic mail which has reached the electronic mail server;

program code means for making the computer detect the size of electronic mail which can be received by the computer; and program code means for making the computer compare the size of the electronic mail, which has reached the electronic mail server, with the size of electronic mail which can be received by the computer.

3. A facsimile server for receiving electronic mail, wherein the facsimile server is connected to an electronic mail server and receives electronic mail from the electronic mail server which has reached the electronic mail server and is addressed to the facsimile server, the facsimile server comprising:

receiving means for receiving electronic mail by the packet when a size of said electronic mail exceeds a size of electronic mail which can be received by the device;

sending means for sending said packets of electronic mail to a designated address when the size of said electronic mail exceeds the size of electronic mail which can be received by the device;

means for referring for the size of said electronic mail which has reached the electronic mail server; and means for comparing the size of said electronic mail which has reached the electronic mail server with the size of electronic mail which can be received by the facsimile server.

4. A facsimile server for receiving electronic mail, wherein the facsimile server is connected to an electronic mail server and receives electronic mail from the electronic mail server which has reached the electronic mail server and is addressed to the facsimile server, the facsimile server comprising:

receiving means for receiving electronic mail by the packet when a size of said electronic mail exceeds a size of electronic mail which can be received by the device;

sending means for sending said packets of electronic mail to a designated address when the size of said electronic mail exceeds the size of electronic mail which can be received by the device; and means for detecting the size of electronic mail which can be received by the facsimile server.

5. A facsimile server for receiving electronic mail, wherein the facsimile server is connected to an electronic mail server and receives electronic mail from the electronic mail server which has reached the electronic mail server and is addressed to the facsimile server, the facsimile server comprising:

receiving means for receiving electronic mail by the packet when a size of said electronic mail exceeds a size of electronic mail which can be received by the device; and sending means for sending said packets of electronic mail to a designated address when the size of said electronic mail exceeds the size of electronic mail which can be received by the device, wherein the designated address is a transmission source of said electronic mail or an information processing device which belongs to a manager of a LAN used for connecting the facsimile server to the electronic mail server.

6. A facsimile server for receiving electronic mail, wherein the facsimile server is connected to an electronic mail server and receives electronic mail from the electronic mail server which has reached the electronic mail server and is addressed to the facsimile server, the facsimile server comprising:

receiving means for receiving electronic mail by the packet when a size of said electronic mail exceeds a size of electronic mail which can be received by the device;

sending means for sending said packets of electronic mail to a designated address when the size of said electronic mail exceeds the size of electronic mail which can be received by the device; and means for receiving a plurality of packets of the electronic mail which has reached the electronic mail server and thereby restoring the electronic mail when the size of said electronic mail which has reached the electronic mail server is smaller than the size of electronic mail which can be received by the facsimile server.

7. A facsimile server for receiving electronic mail, wherein the facsimile server is connected to an electronic mail server and receives electronic mail from the electronic mail server which has reached the electronic mail server and is addressed to the facsimile server, the facsimile server comprising:

receiving means for receiving electronic mail by the packet when a size of said electronic mail exceeds a size of electronic mail which can be received by the device; and sending means for sending said packets of electronic mail to a designated address when the size of said electronic mail exceeds the size of electronic mail which can be received by the device, wherein when the size of said electronic mail exceeds the size of electronic mail which can be received by the facsimile server, text of said electronic mail which is sent to the designated address includes a message to the effect that said electronic mail is not receivable because of an excess of a size.

8. For use with a facsimile server connected to an electronic mail server via a LAN, a communication method comprising the steps of:

referring to the electronic mail server for a size of electronic mail which has reached the electronic mail server;

comparing the size of the electronic mail, which has reached the electronic mail server, with a size of electronic mail which can be received by the facsimile server;

receiving said electronic mail by the packet when the size of said electronic mail exceeds the size of electronic mail which can be received by the facsimile server; and sending said electronic mail by the packet as error electronic mail to a designated address when the size of the electronic mail exceeds the size of electronic mail which can be received by the facsimile device.

9. An electronic mail device for receiving electronic mail, wherein the electronic mail device is connected to an electronic mail server and receives electronic mail from the electronic mail server which has reached the electronic mail server and is addressed to the electronic mail device, the electronic mail device comprising:

receiving means for receiving electronic mail by the packet when a size of said electronic mail exceeds a size of electronic mail which can be received by the device;

sending means for sending said packets of electronic mail to a designated address when the size of said electronic mail exceeds the size of electronic mail which can be received by the device;

means for referring for the size of said electronic mail which has reached the electronic mail server; and means for comparing the size of said electronic mail which has reached the electronic mail server with the size of electronic mail which can be received by the electronic mail device.

10. An electronic mail device for receiving electronic mail, wherein the electronic mail device is connected to an electronic mail server and receives electronic mail from the electronic mail server which has reached the electronic mail server and is addressed to the electronic mail device, the electronic mail device comprising:

receiving means for receiving electronic mail by the packet when a size of said electronic mail exceeds a size of electronic mail which can be received by the device;

sending means for sending said packets of electronic mail to a designated address when the size of said electronic mail exceeds the size of electronic mail which can be received by the device; and means for detecting the size of electronic mail which can be received by the electronic mail device.

11. An electronic mail device for receiving electronic mail, wherein the electronic mail device is connected to an electronic mail server and receives electronic mail from the electronic mail server which has reached the electronic mail server and is addressed to the electronic mail device, the electronic mail device comprising:

receiving means for receiving electronic mail by the packet when a size of said electronic mail exceeds a size of electronic mail which can be received by the device; and sending means for sending said packets of electronic mail to a designated address when the size of said electronic mail exceeds the size of electronic mail which can be received by the device, wherein the designated address is a transmission source of said electronic mail or an information processing device which belongs to a manager of a LAN used for connecting the electronic mail device to the electronic mail server.

12. An electronic mail device for receiving electronic mail, wherein the electronic mail device is connected to an electronic mail server and receives electronic mail from the electronic mail server which has reached the electronic mail server and is addressed to the electronic mail device, the electronic mail device comprising:

receiving means for receiving electronic mail by the packet when a size of said electronic mail exceeds a size of electronic mail which can be received by the device;

sending means for sending said packets of electronic mail to a designated address when the size of said electronic mail exceeds the size of electronic mail which can be received by the device; and means for receiving a plurality of packets of the electronic mail which has reached the electronic mail server and thereby restoring the electronic mail when the size of said electronic mail which has reached the electronic mail server is smaller than the size of electronic mail which can be received by the electronic mail device.

13. An electronic mail device for receiving electronic mail, wherein the electronic mail device is connected to an electronic mail server and receives electronic mail from the electronic mail server which has reached the electronic mail server and is addressed to the electronic mail device, the electronic mail device comprising:

receiving means for receiving electronic mail by the packet when a size of said electronic mail exceeds a size of electronic mail which can be received by the device; and sending means for sending said packets of electronic mail to a designated address when the size of said electronic mail exceeds the size of electronic mail which can be received by the device, wherein when the size of said electronic mail exceeds the size of electronic mail which can be received by the electronic mail device, text of said electronic mail which is sent to the designated address includes a message to the effect that said electronic mail is not receivable because of an excess of a size.

* * * * *